United States Patent [19]

Das Gupta

[11] Patent Number: 4,894,852
[45] Date of Patent: Jan. 16, 1990

[54] X-RAY SOURCE WITH DUAL MONOCRYSTAL TARGETS

[76] Inventor: Kamalaksha Das Gupta, 2918-69th St., Lubbock, Tex. 79413

[21] Appl. No.: 44,232

[22] Filed: Apr. 30, 1987

[51] Int. Cl.$^4$ ................................................ H01S 3/16
[52] U.S. Cl. .......................................... 378/119; 372/5
[58] Field of Search .................... 372/5; 378/119, 124, 378/84, 3, 121, 143

[56] References Cited

PUBLICATIONS

Kamalaksha Das Gupta; "Investigations In X-Radiation Stimulation"; Mar. 1982, pp. 1-25.
Mahendra Lal Sircar Lecture (part-I) Delivered At The Indian Association For The Cultivation of Science On Jan. 3, 1984, by K. Das Gupta.
Non-Linear Increase in Bragg Peak and Narrowing of X-Ray Lines by K. Das Gupta.
Studies of the Non-Linear Rise in Intensity of X-Ray Lines by K. Das Gupta, A. A., Bahgat and P. J. Seibt.
"Coherent Emission of Characteristic Lines on Passage of Charged Particles Through a Single Crystal", 1976, American Institute of Physics by S. A. Akhmanov and B. A., Grishanin.
Coherent y-Emission by Stimulated Annihilation of Electron-Positron Pairs, by M. Bertolotti and C. Sibilia, Appl. Phys. 19, 127 130 (1979).
"Stimulated x-ray Fluorescence from Excited Crystal" Proceedings of The International Society for Optical Engineering, vol. 743, 1-1987.

Primary Examiner—William L. Sikes
Assistant Examiner—B. R. R. Holloway
Attorney, Agent, or Firm—William W. Haefliger

[57] ABSTRACT

A method of producing X-rays employs a first monocrystal having parallel lattice planes and an optically flat planar face extending at the Bragg angle $\theta_B$ or less than $\theta_B$ relative to said planes, and includes:
(a) exciting the monocrystal at its face, and along a line thereon, and
(b) impinging Kossel photons on that line at the slant cut crystal face, at an impingement angle of $2\theta_B$ relative to that line,
(c) whereby an intense Bragg reflected narrow width X-ray emission line occurs in a direction which is an extension of the line.

17 Claims, 5 Drawing Sheets

Q = ANGLE BETWEEN FACE BC AND (200) LATTICE PLANES OF LiF MONOCRYSTAL

4,894,852

X-RAY SOURCE WITH DUAL MONOCRYSTAL TARGETS

BACKGROUND OF THE INVENTION

This invention relates generally to X-ray production, and more particularly to a novel X-ray source using two monocrystal targets in alignment.

There is perceived need in many applications and areas for devices to produce very high intensity monochromatic X-rays, and particularly by means of an action of concentrating X-ray photons to be emitted in a narrow beam of variable widths and intensities.

SUMMARY OF THE INVENTION

It is a major object of the invention to provide method and means meeting the perceived need as referred to. The method of the invention basically employs a monocrystal having parallel lattice planes and an optically flat planar face extending at the Bragg angle $\theta_B$ relative to such planes; and in this environment, the method includes the steps:

(a) exciting the monocrystal at its face, and along a line thereon, with a desired width of the line and (b) impinging Kossel photons on that line at the crystal face, at an impingment angle of $2\theta_B$ relative to that line, as from a second identical excited monocrystal, (c) whereby stimulated X-ray emission occurs in a direction which is an extension of the line beyond a threshold current density or radiation density to excite the crystal.

In its apparatus aspects the invention is directed to a combination that includes:

(a) a first monocrystal having parallel lattice planes, and an optionally flat planar face extending at an angle $\theta_B$ relative to said lattice planes, where $\theta_B$ is the Bragg angle, (b) first means located to excite the first monocrystal at said face, and along a line at the intersection with said face of another plane normal to said face and normal to said lattice planes, (c) and other means producing beams of Kossel photons impinging on said line at said face, said beams directed at angles $2\theta_B$ relative to said line, (d) whereby stimulated X-ray emission occurs, in a direction which is an extension of said line.

As will appear, the first means to excite the crystal may include first electron gun means located to direct beams electrons focused substantially along said line; and the other means to produce Kossel photons may comprise a second monocrystal having a face, and second electron gun means directing second beams of electrons at said face of the second monocrystal.

The invention has many applications, among which are X-ray tube uses; and X-ray mammography, X-ray osteoporosis, X-ray lithography, and directed X-ray beams, as will appear.

These and other objects and advantages of the invention, as well as the details of an illustrative embodiment, will be more fully understood from the specification and drawings, in which:

DRAWING DESCRIPTION

FIG. 1 is a system diagram;

FIGS. 2(a), 2(b), and 2(c), are sections showing applications of the invention to monocrystals of three different compositions;

FIGS. 3(a)–(d) are sections relating different Renninger cut angles of the monocrystal to intensity of a resultant collimated beam of X-rays;

DETAIL DESCRIPTION

Figure 1:
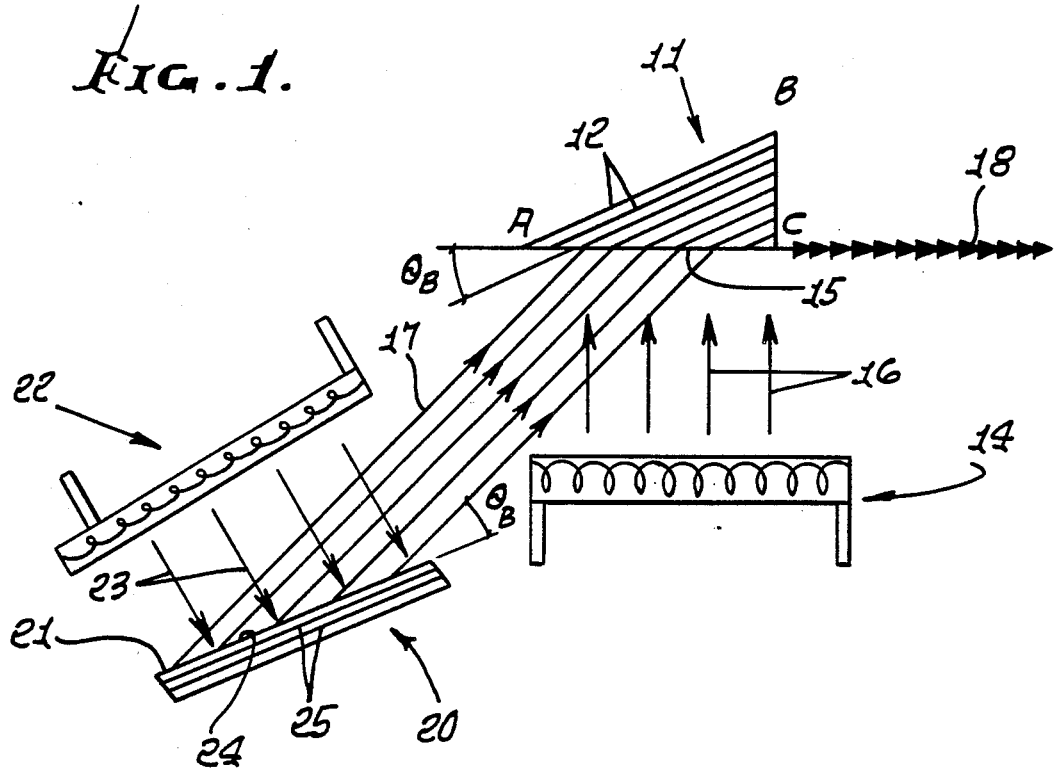

Referring first to FIG. 1, the illustrated X-ray laser includes a first monocrystal 11 having parallel lattice planes 12, and an optically flat planar face 13 extending at an angle $\theta_B$ relative to such planes, $\theta_B$ being the Bragg angle. The crystal has typically slant cut face 13 (see line AC) polished and etched. For a copper monocrystal as shown, the angle $\theta_B$ is 21° 65 minutes. Monocrystals of other metals may be employed, and for which the Bragg angles will of course differ.

First means is provided to excite the crystal at face 13 and along a line 15 which is at the intersection with the face of anoher plane (the plane of FIG. 1) normal to face 13 and normal to the lattice planes 12. The output beam along AC 18, the driving frequency beam 17 and the normal to face 13 and lattice planes 12 must lie in the same Bragg reflecting plane. In the example, such means is shown to comprise electron gun means 14 located to direct beams 16 of electrons toward face 13, and focused on and along line 15. An alternative usable means is a line focus radiation pumping means, and 14 may be considered to represent same.

Also provided is other means to produce beams 17 of Kossel $K\alpha_1$ photons directed toward and impinging on line 15 at face 13. Such beams are directed at angles $2\theta_B$ relative to the line 15, as shown, where $\theta_B$ is, again, the Bragg angle. As a result, directed intense X-ray emission occurs, as at 18, and in a direction which is an extension of the line 15. In this regard, the Kossel photon beams 17 are reflected by the mono-crystal, at the lattice planes 12 closest to the face 13, so as to flow along the face 13, and along the line 15, to re-inforce the intensity of Bragg reflection, i.e. the high concentration of $K\alpha_1$ photons passing along line 15 effect high intensity X-ray production.

The referenced other means to produce beams 17 is shown in the example to comprise a second monocrystal 20 having a face 21, and second electron gun means 22 to direct second beams 23 of electrons at that face 21. The beams 23 are focused at a line 24 on face 21, parallel to crystal lattice planes 25; accordingly, the beams 17 are focused on and along line 15. The angle $\theta_B$ of emission of beams 17 from the crystal 20 is, again, the Bragg angle which for copper is 21° 65 minutes, both crystals 11 and 20 typically having the same atomic composition. The crystal may be face centered, body centered, diamond structure, hexagonal and other crystal structures.

The slant cut angle $\theta_B$ of crystal 11 is such that Kossel photons ($K\alpha_1$, $K\beta_1$, $K\beta_5$ etc.) produced flow along the line 15 on the slant cut surface of the crystal. When the rate of K-hole production in the crystal 11 is high, due to a high density electron beam along 15, and the Kossel radiation 17 from the crystal 20 is intense (as it is due to focussing on line 15), X-ray intense emission starts beyond a threshold due to combined photon flux along 15. It has been demonstrated, and is known, that when copper is doped in germanium, the Kossel photon of copper is emitted strongly in a direction determined by the Bragg formula for copper $K\alpha_1$, for germanium lattice planes. Due to the generation of a highly intense beam of $CuK\alpha_1$ Kossel photons along line 15, the probability of a flowing $K\alpha_1$ photon to encounter an excited atom is increased.

The intensity of X-ray emission is further increased by the driving frequency of copper $K\alpha_1$ from monocrystal 20. In monocrystal 20, the lattice planes 25 are parallel to the crystal face $M_1M_2$. See FIG. 1. The monocrystal 20 is aligned accurately with respect to monocrystal 11 so that the parallel beams of Kossel photons from the excited atoms of monocrystal 25 strike the excited atoms of monocrystal 11, accurately at the Bragg angle 21° 65 minutes. Such a coupling of two monocrystals enhances the intensity of the output X-ray beam. Beam 17, could also be a monochromatized copper $K\alpha_1$, by a good crystal (LiF, quartz etc.) from a copper X-ray tube.

In a preliminary experiment, the monocrystal 25 was replaced by a polycrystalline copper target and the face of the monocrystal 11 was parallel to copper lattice planes. A collimated beam from 20 strikes 11 at the Bragg angle. When monocrystal 11 was pumped by an electron beam of current density 50–80 amps/sq. cm., an intense X-ray beam from 20, reflected from the active crystal 11, was observed.

The excited atoms at the crystal surface have depth of the order of 1–10 microns, approximately. This thickness depends on the degree of smoothness of the surface, mass absorption coefficient $\mu/\rho$ of the X-ray frequency in the lasing crystal, i.e. the $\mu/\rho$ of $CuK\alpha_1$ in copper, silver $K\alpha_1$ in Ag, gold $K\alpha_1$ in gold and so on. The penetrability of electron beams to excite the lasing crystal is given by an empirical formula; the depth of penetration is a function of the electron's kinetic energy and the atomic number Z (for Cu29), (for Au=79) of the excited crystals and this is of the order of 1–10 microns thick.

The method described for copper monocrystal can be extended for other monocrystals or compounds. The essential criteria is to attain a precision orientation cut of the monocrystal target. The rule is to select the strongest reflecting planes of the slant cut crystal for better efficiency. The critical angle $\alpha_0$ as shown in FIGS. 2(a), 2(b), 2(c) between the lasing face and the lattice planes must be the Bragg angle for $K\alpha_1$, the strongest emission line for the strongest reflecting planes of the same crystal for maximum efficiency.

For the face centered cubic crystal of space group of O 5/H, the strongest reflecting plane is (111). For the body centered cubic the strongest plane is (110) and for the diamond structure cubic the strongest reflecting plane is (111).

An alternative method is to dope the lasing atoms in a high quality crystal of silicon or germanium. Below 1 to 2 percent of doping elements, the element is in a solid solution and occupies the interstitial positions in a matrix monocrystal. It is expected with a critical slant cut angle $\angle \alpha_0 = \theta \text{Bragg} = 14°.22$ of silicon (111) face, $CuK\alpha_1$ from doped copper atoms in silicon will graze along the slant cut surface of silicon.

Figure 2A:
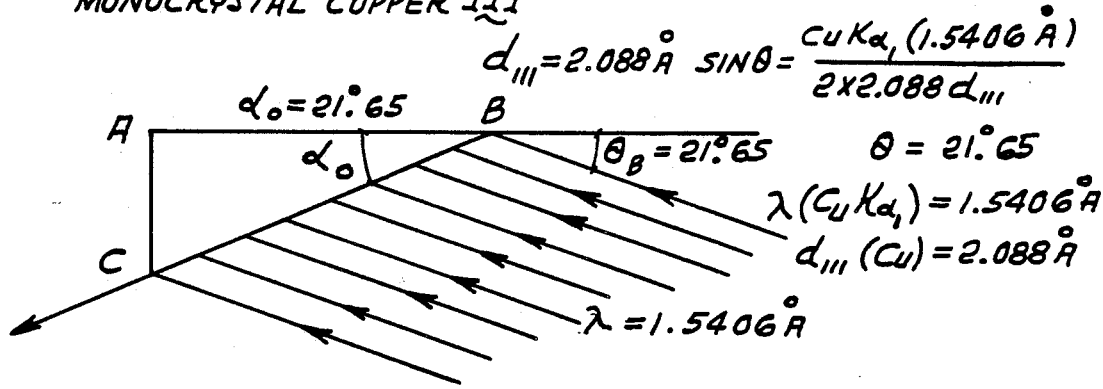
Figure 2B:
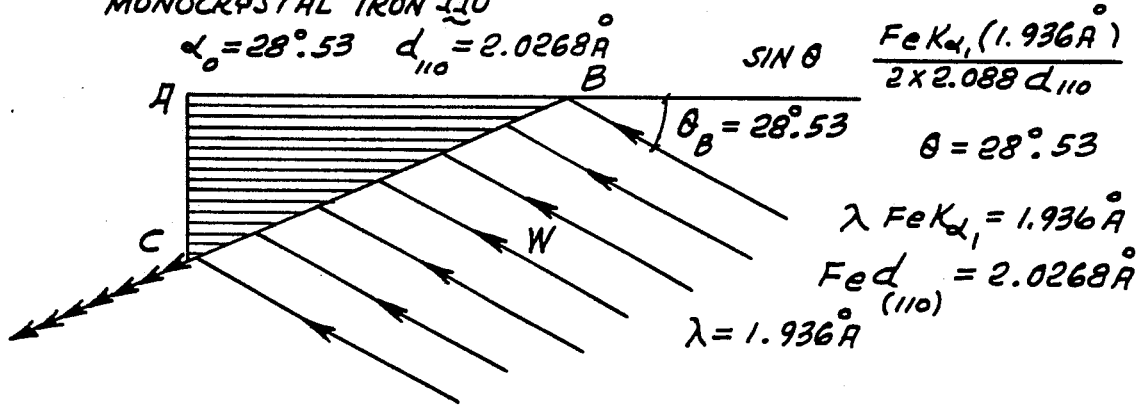
Figure 2C:
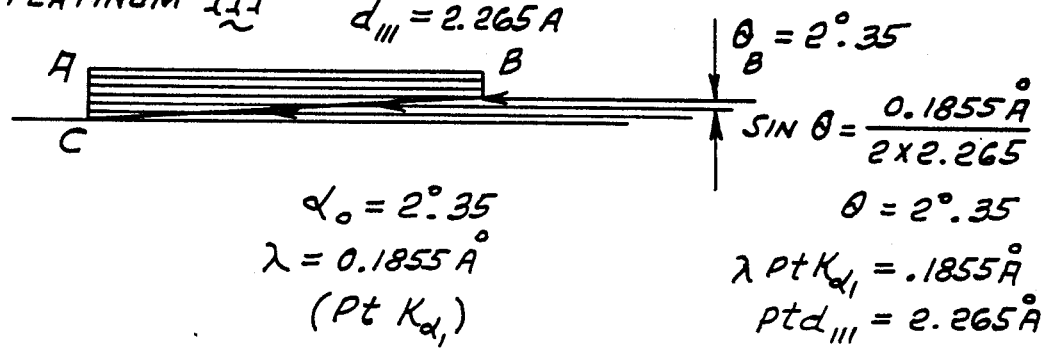
Figure 3A:
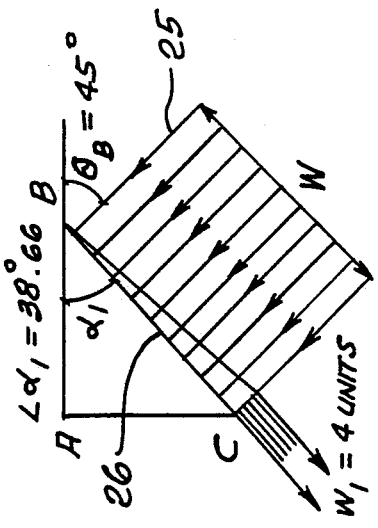
Figure 3B:
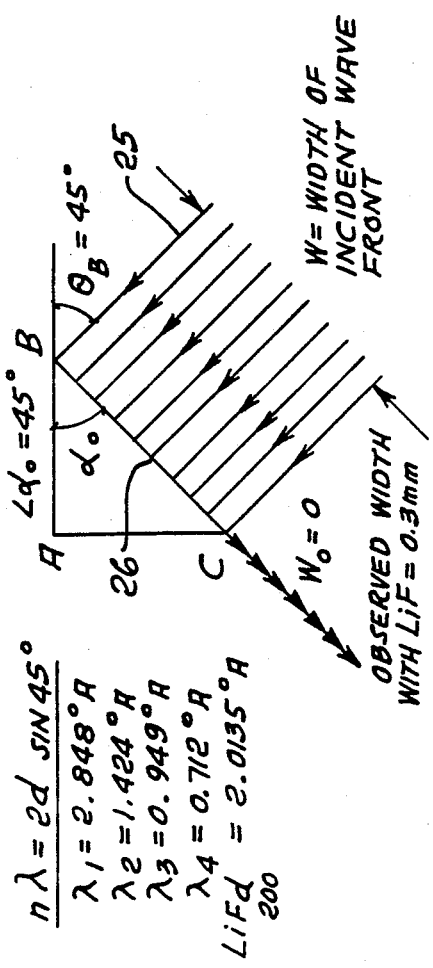
Figure 3C:
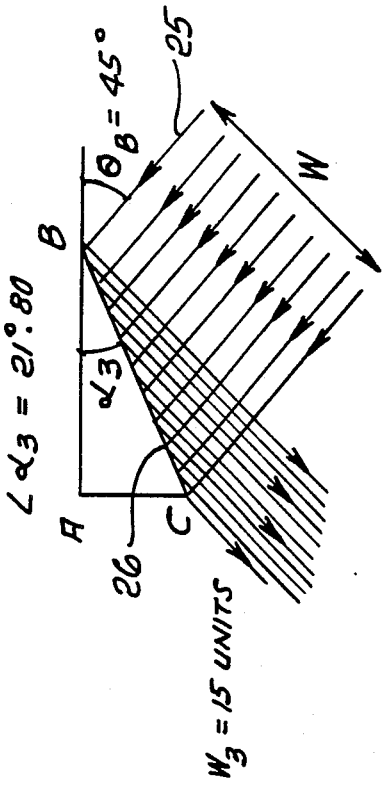
Figure 3D:
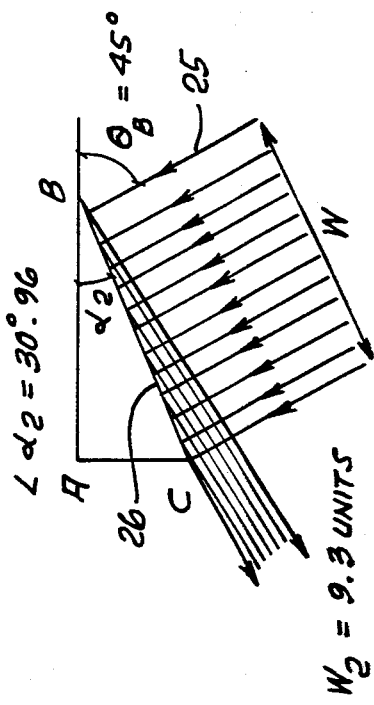

Each of FIGS. 2(a), 2(b), and 2(c) shows a usable monocrystal 11 like that of FIG. 1, except the crystals are of different materials, copper for FIG. 2(a); iron for FIG. 2(b), and platinum for FIG. 2(c). The corresponding Bragg angles $\theta_B$ are as given in the following:

TABLE

| | Metal | $\Theta_B$ |
|---|---|---|
| FIG. 2(a) | copper | 21° 65 minutes |
| FIG. 2(b) | iron | 28° 53 minutes |
| FIG. 2(c) | platinum | 2° 35 minutes |

Figure 3E:
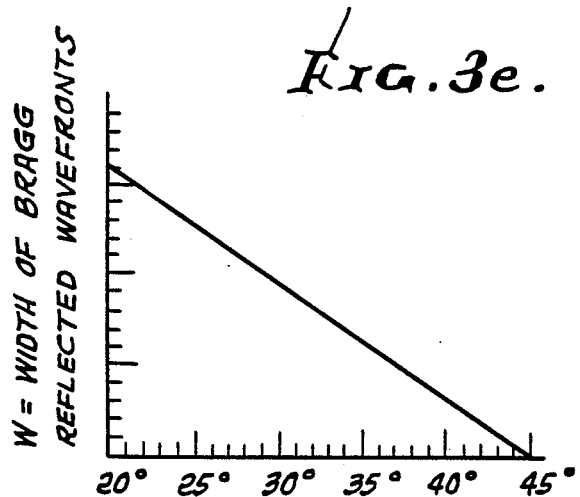
FIG. 3(e) is a graph; showing highest photon concentration along the slant cut face at 45° for specific frequencies.

FIGS. 3(a)–(d) show or relate the intensity of a collimated beam or beams 25 of X-rays, to the das Gupta cut angle $\alpha$ of a lithium fluoride crystal, the beam 25 extending parallel to the cut surface 26. For wavelength $\lambda_1 = 2.848$ Å striking the crystal face BC, FIG. 3(a) the Bragg angle $\alpha_0 = 45°$ in LiF(200) and the incident beam 25 of width W is Bragg reflected only along the slant cut face BC with a drammatic increase in intensity. This is easily demonstrated. The intensity of $\lambda_1$, gradually decreases as the deviation from 45° increases FIGS. 3(b)–3(d). This is shown graphically in FIG. 3(e).

Methods of operating of monocrystals include:

(1) Pulsed power microfocus electron beam: The conventional microfocus system with a control bias produces a fine focus 30 micron×100 micron electron beam to a polycrystalline copper target; see Das Gupta Physics Letters, 46A, 179 (1973). A liné focus electron beam 1 cm. long from $L_1$ to $L_2$ of FIG. 1, with a width of 2 to 3 hundred microns, which is 0.2 to 0.3 mm wide, and with a current density of 50 ampere/sq.cm., is obtained by an extension of the existing technique of producing a microfocus beam. The optimum operating potential for copper is 20 KV and a pulsed power of 1 millisecond. The pulse width covers 1 to 10 seconds when copper crystal is cooled by water circulation or oil circulation.

(2) Dispenser cathode (tungsten base): X-ray production is expected with a low current density of 10–20 amperes per sq. cm. Dispenser cathodes are commercially available to pump the lasing crystal as well as the crystal, to generate the driving frequency.

(3) Cold Field emission technique: Now in use in commercial flash X-ray systems can be used to produce intense line source of X-rays for radiation pumping along 15.

(4) Radiation pumping: The L-series tungsten lines are immediately above K-ionization of nickel lasing crystal for nickel $K\alpha_1$. Tungsten target radiation at 20 KV and 100 mA can be used to produce a line source of tungsten L-lines focused onto $L_1$ $L_2$ of a nickel monocrystal (line 15), for $NiK\alpha_1$ intense emission. A gold target, L-series, will ionize K-shell electrons of copper monocrystal very effectively, since all L-series lines of gold have photon energies immediately above the K-ionization of copper.

Advantages of the invention include:
(1) The special cut of the lasing crystal 11 concentrates most of $\kappa\alpha_1$ Kossel photons flowing along the intense emission line 15 ($L_1L_2$) FIG. 1.
(2) The driving frequency of $CuK\alpha_1$ from either the copper monocrystal 20 or from an intense $CuK\alpha_1$ radiation from a Philips copper target (for radiation) further enhances the intensity output from crystal 11, due to a simultaneous Bragg reflection of the collimated beam and the channeling radiation Kossel $\kappa\alpha_1$ photons traveling along the slant crystal face AC.
(3) Simple calculation reveals that due to this device, threshold pumping rate is dramatically reduced.
(4) The reduction of the pumping power makes it possible to build a continuous wave X-ray laser, with an oil cooling or water cooling device for the monocrystal target.

(3) Intense directed emission is possible with the slant cut monocrystal, provided the path length $L_1 L_2$ is increased sufficiently. This is an important finding.

(4) With a highly polished, etched and optically flat emitting face of the crystal, the Kossel photons flowing along the emitting face AC undergo the well known total optical reflection of $CuK\alpha_1$ which is close to 100 percent efficient between 0° and the critical angle $\theta_c$ less than a quarter of a degree.

(7) The Bragg reflection of the driving frequency from crystal 20, the total optical X-ray reflection at the slant surface AC of crystal 11, and the highly concentrated photon flux due to the special slant cut, all cooperate to initiate the boosting of intensity along $L_1 L_2$ line 15.

Figure 4:
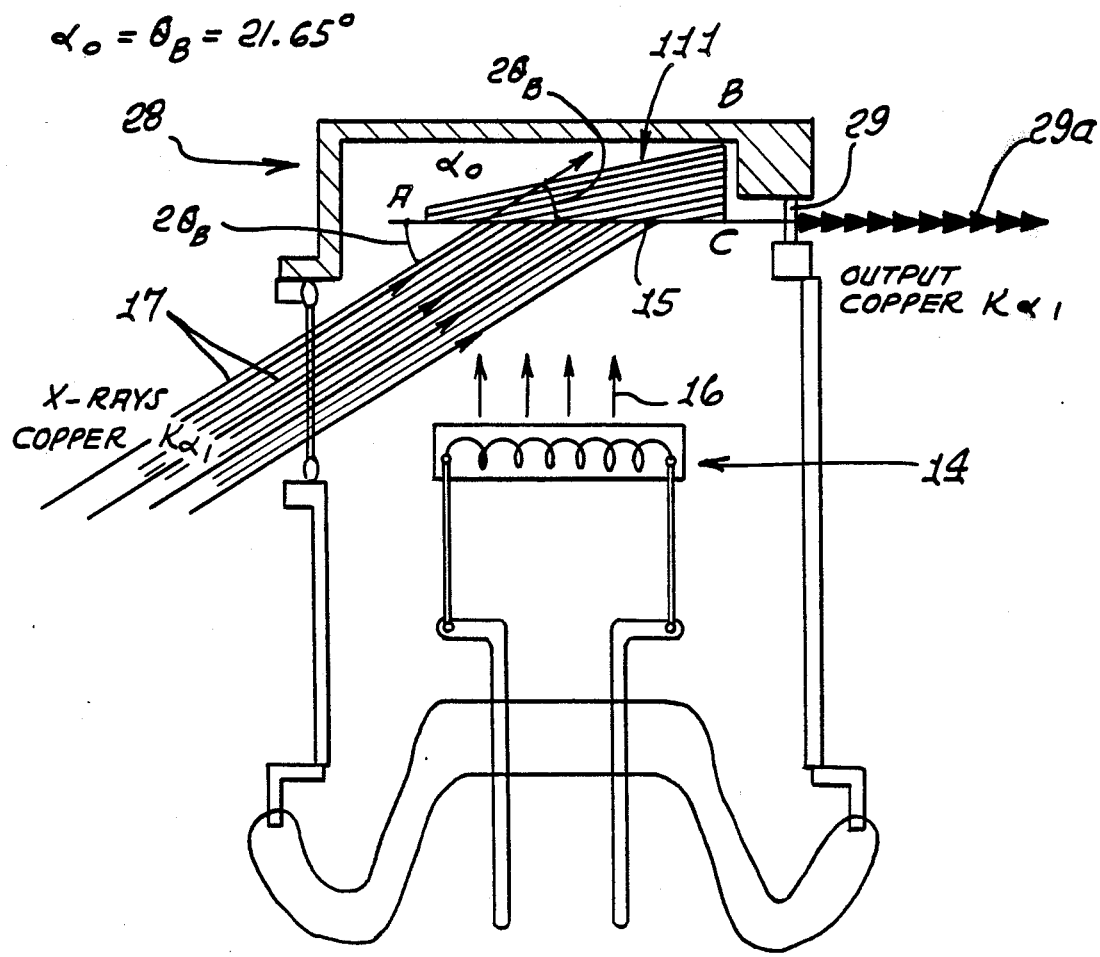
FIG. 4 is a section showing application of the invention to an X-ray tube.

Application of the intense directed monochromatic beam (1) Using only one slant-cut monocrystal of copper, nickel, iron, etc. at the critical Bragg resonance angles as described herein, efficient X-ray laser diffraction tubes as shown at 28 in FIG. 4, can be commercially manufactured. From the exit beryllium window 29 only a sharp monochromatic, intense nondivergent, X-ray $\kappa\alpha_1$ line 29a will be emitted without using, or need for, any collimator. The signal-to-noise ratio is very high; significant improvements in X-ray diffraction tubes become possible.

(2) Using the intense line source of monochromatic frequency of energy 26.36 KeV ($SbK\alpha_1$) from antimony doped in monocrystal of copper or tungsten and the critical slant cut angle to obtain $SbK\alpha_1$ as the output X-ray line, there is an improvement in X-ray mammography applications. The improvement is due to the efficiency of K-ionization of selenium, so one photon of $SbK\alpha_1$ has the probability of ionizing 2 atoms of selenium. This reduces the X-ray exposure dose to the patient.

Figure 5:
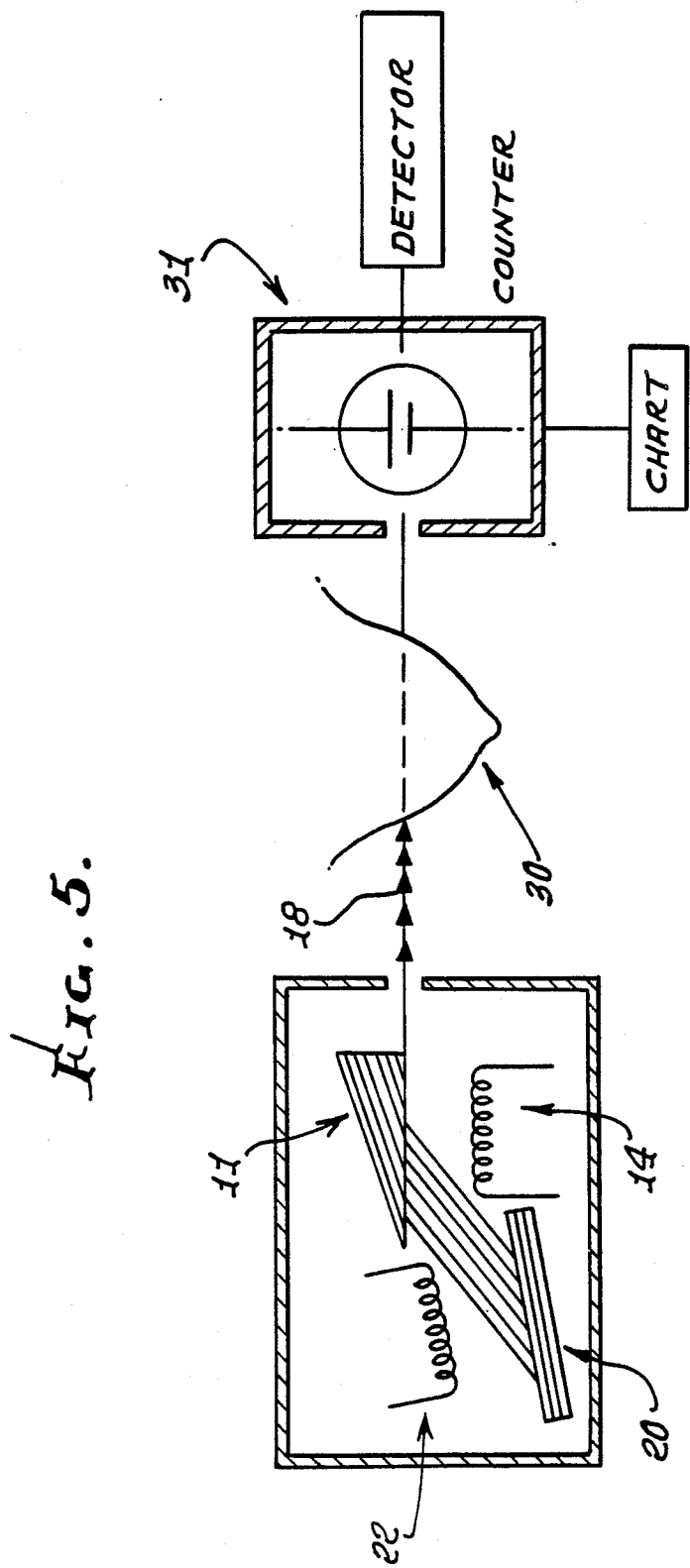
FIG. 5 is a diagram showing application of the invention to production of a mammogram.

(3) Scanning Electro-Mammogram. The X-ray line source is coupled to a detector, such that the radiation passing through the test object (breast) is received directly by the detector. No other secondary scattered radiation can enter the detector due to source-detector alignment improving signal to noise ratio. See FIG. 5, showing FIG. 1 source of high intensity X-ray passing through breast 30 and to a detector 31 counter.

When the angle $\theta_B$ in FIG. 1 between 12 and 13 is equal to 2° satisfying the Bragg reflection condition for the de Broglie wavelength $\lambda_e = 0.146$ Å of the strong $KL_2L_3$ Auger electrons of copper of energy 7035 eV, a directed electron beam of the same energy flows along 15 and emitted along 18 an extension of 15. Internal Bragg resonance of $KL_2L_3$ Auger electron from excited copper crystal generate electron Kossel modes in monocrystals. The Auger electrons flow along 15 due to the Bragg-de Broglie slant cut angle $\theta$ that varies from one element to another for the monocrystal of that element. This is a new technique of generating a sharp line of a directed electron beam. This process is very efficient for low Z elements like silicon and others, since the cross section of Auger electron emission process increases as the atomic number of the element decreases. Such nondivergent monoenergetic electron beams will be applied for electron beam lithography technology in micro-electronics industry and in electron diffraction work.

I claim:

1. In an X-ray source with dual monocrystal targets, the combination comprising:
   (a) a first monocrystal having parallel lattice planes, and an optically flat, slant cut, planar face extending at an angle $\theta_B$ relative to said lattice planes where $\theta_B$ is the Bragg angle,
   (b) first means located to excite the first monocrystal at said face, and along a line at the intersection with said face of another plane normal to said face and normal to said lattice planes,
   (c) and other means producing beams of Kossel $K\alpha_1$ photons impinging on said line at said face, said beams directed at angles $2\theta_B$ relative to said line,
   (d) whereby intense X-ray emission occurs, in a direction which is an extension of said line,
   (e) said other means comprising a second monocrystal having a face at an angle $\theta_B$ relative to said line, and electron gun means directing second beams of electrons at said face of the second monocrystal.

2. The combination of claim 1 wherein said crystal consists essentially of a monocrystal of copper.

3. The combination of claim 1 wherein said crystal consists essentially of a monocrystal of iron.

4. The combination of claim 1 wherein said crystal consists essentially of a monocrystal of platinum.

5. The combination of claim 1 wherein said first means includes first electron gun means located to direct beams of electrons focused substantially along said line.

6. The X-ray combination of claim 1 wherein said first means comprises radiation pumping means.

7. The combination of claim 2 wherein the angle $\theta_B$ is 21° 65 minutes.

8. The combination of claim 3 wherein the angle $\theta_B$ is 28° 53 minutes.

9. The combination of claim 4 wherein the angle $\theta_B$ is 2° 35 minutes.

10. The combination of claim 1 wherein crystal material within a zone 1 to 10 microns thick, as measured into the crystal from said line, is excited by said first means.

11. The combination of claim 1 wherein said Kossel $K\alpha_1$ photons are emitted from said face of the second monocrystal at an angle $\theta_B$ relative thereto.

12. The combination of claim 1 wherein said second monocrystal consists of the same atomic material as said first crystal.

13. The combination of claim 11 wherein the second monocrystal has lattice planes parallel to said face thereof.

14. The combination of claim 1 including an X-ray tube having envelope structure for said crystal and said gun means, said tube having an outlet to pass said X-ray emission, in alignment with said line.

15. The combination of claim 1 wherein the first monocrystal consists essentially of nickel.

16. The method of producing X-rays employing a first monocrystal having parallel lattice planes and an optionally flat planar face extending at the Bragg angle $\theta_B$ relative to said planes that includes:
   (a) exciting the monocrystal at its face, and along a line thereon, said face slant cut at said angle $\theta_B$, and
   (b) impinging Kossel photons on that line at the crystal face, at an impingement angle of $2\theta_B$ relative to that line, (c) whereby intense X-ray emission occurs in a direction which is an extension of the line,
(d) said step (b) including providing a second monocrystal having a face, orienting said face at an angle $\theta_B$ relative to said line, and directing beams of electrons at said face of the second monocrystal to excite the second monocrystal thereby to produce said Kossel photons.

17. In a beam generating apparatus, the combination comprising:
(a) first monocrystal having parallel lattice planes, and an optically flat, slant cut, planar face extending at an angle $\theta_B$ relative to said lattice plane, where $\theta_B$ is the Bragg angle, said monocrystal consisting essentially of copper, and said angle $\theta_B$ being about 2°,
(b) first means located to excite the first monocrystal at said face, and along a line at the intersection with said face of another plane normal to said face and normal to said lattice planes,
(c) and other means producing beams of Kossel $K\alpha_1$ photons impinging on said line at said face, said beams directed at angles $2\theta_B$ relative to said line,
(d) whereby directed electron beam emission occurs, in a direction which is an extension of said line,
(e) said other means comprising a second monocrystal having a face at an angle $\theta_B$ relative to said line, and electron gun means directing second beams of electrons at said face of the second monocrystal.

* * * * *